(12) United States Patent
Nishihara et al.

(10) Patent No.: US 6,800,693 B2
(45) Date of Patent: Oct. 5, 2004

(54) OLEFIN POLYMER COMPOSITION

(75) Inventors: Hajime Nishihara, Yokohama (JP);
Ikuji Ohtani, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/318,080

(22) Filed: Dec. 13, 2002

(65) Prior Publication Data

US 2004/0116605 A1 Jun. 17, 2004

(51) Int. Cl.$^7$ .................. C08L 9/00; C08L 27/04; C08L 33/02; C08L 33/14; C08L 35/02
(52) U.S. Cl. .............. 525/191; 525/214; 525/222; 525/232; 525/238; 525/240; 525/241
(58) Field of Search ................... 525/191, 214, 525/222, 232, 238, 240, 241

(56) References Cited

U.S. PATENT DOCUMENTS

| | | | |
|---|---|---|---|
| 6,403,716 B1 * | 6/2002 | Nishihara | ............ 525/191 |
| 6,506,839 B1 * | 1/2003 | Nishihara et al. | ............ 525/191 |
| 6,555,624 B2 * | 4/2003 | Nishihara et al. | ............ 525/191 |
| 6,646,052 B2 * | 11/2003 | Singh et al. | ................ 525/191 |

\* cited by examiner

*Primary Examiner*—Nathan M. Nutter
(74) *Attorney, Agent, or Firm*—Birch, Stewart, Kolasch & Birch, LLP (57) ABSTRACT

An olefin polymer composition, which comprises a cross-linked olefin polymer composition comprising at least one cross-linking rubber like polymer (A) and an olefin resin (B), the cross-linking rubber like polymer (A) being selected from the group consisting of (1) an ethylene-α-olefin copolymer, which contains an ethylene unit and an α-olefin unit having 3 to 20 carbon atoms, and which is produced using a metallocene catalyst, and (2) at least one hydrogenated rubber selected from the group consisting of a homopolymer of a conjugated diene monomer and a copolymer thereof, in which rubber not less than 50% of all olefinic double bonds are hydrogenated, wherein the cross-linking rubber like polymer (A) has a weight average particle diameter of from 0.01 to 3 μm.

12 Claims, 1 Drawing Sheet

OLEFIN POLYMER COMPOSITION

CROSS-REFERENCE TO RELATED APPLICATIONS

This application is based on JP-A 2000-342302, filed Jun. 1, 2000 and related to the following applications, and all disclosure including fundamental concept of the invention and preferred embodiments are incorporated by reference in the present specification.

U.S. Pat. No. 6,087,431, JP-A-2001-261901, WO 00/61662, WO 00/61681, JP-A-2002-121329 (U.S. patent application Ser. No. 689,608), WO 01/48079 A1, JP-A-2001-226524, JP-A-2002-179879, JP-A-2002-167472 and JP-A-2002-69252

BACKGROUND OF THE INVENTION (1) Field of the Invention

The present invention relates to an olefin thermoplastic polymer composition. More specifically, the present invention relates to an olefin thermoplastic polymer composition superior in mechanical strength, appearance and moldability.

(2) Description of the Related Art

As well known in the art, a thermoplastic elastomer composition has been obtained by so-called dynamic cross-linking, according to which a rubber like polymer such as a radical cross-linking olefin elastomer and a non-radical cross-linking olefin resin such as polypropylene are melt-kneaded and cross-linked in an extruder in the presence of a radical initiator. The elastomer composition has been extensively applied for various uses such as car parts.

As such an olefin elastomer, ethylene-propylene-diene rubber (EPDM) and an elastomer produced using a metallocene catalyst (JP-A 8-120127 and JP-A 9-137001) are known. However, those mentioned above are not always sufficient in their appearance and moldability, and particularly when a cross-linking degree is increased for the purpose of improving mechanical strength and oil resistance, a huge dispersion product owing to cross-linked rubber is produced to markedly deteriorate the mechanical strength and appearance.

On the other hand, as a prior art for improving physical properties of the olefin rubber obtained by the dynamic cross-linking, there are disclosed a process for producing a thermoplastic rubber composition by cross-linking an olefin rubber and an olefin resin, characterized in that a dynamic heat treatment is repeated more than one time (JP-A-58-145741), a process for producing a rubber composition by adding an organic peroxide, namely a cross-linking agent on the way (JP-A-9-95540), a process for producing a rubber composition by adding a master batch of an organic peroxide and a polypropylene resin on the way (JP-A-6-170914), and a production process comprising kneading the whole of a rubber component and a part of a cross-linking agent to perform cross-linking, thereafter kneading a resin component therewith and further kneading the remaining cross-linking agent therewith to complete cross-linking (JP-A-2002-194096). However, balance characteristics of the mechanical strength, oil resistance and appearance are not sufficient, and therefore, a thermoplastic elastomer composition sufficient to practical use has been desired.

SUMMARY OF THE INVENTION

Under these circumstances, an object of the present invention is to provide an olefin thermoplastic polymer composition, which is freed from the problems mentioned above, in other words, which is superior in its mechanical strength, appearance and moldability.

The present inventors have undertaken extensive studies to find an olefin thermoplastic polymer composition superior in its mechanical strength, appearance and moldability. As a result, it has been found that when a rubber like polymer has a specific particle diameter, surprisingly, not only its appearance but also its mechanical strength and its moldablity can be far improved. Thereby, the present invention has been obtained.

That is, the present invention provides an olefin polymer composition, which comprises a cross-linked olefin polymer composition comprising at least one cross-linking rubber like polymer (A) and an olefin resin (B), the cross-linking rubber like polymer (A) being selected from the group consisting of (1) an ethylene-α-olefin copolymer, which contains an ethylene unit and an α-olefin unit having 3 to 20 carbon atoms, and which is produced by using a metallocene catalyst, and (2) at least one hydrogenated rubber selected from the group consisting of a homopolymer of a conjugated diene monomer and a copolymer thereof, in which rubber not less than 50% of all olefinic double bonds are hydrogenated, wherein the cross-linking rubber like polymer (A) has a weight average particle diameter of from 0.01 to 3 μm.

Further, the present invention provides a process for producing an olefin polymer composition, which comprises cross-linking the above-defined (A) and (B) with a cross-linking agent (C) at a melt viscosity ratio $\eta_A/\eta_B$ of from 0.5 to 5, where $\eta_A$ and $\eta_B$ are measured under conditions of a melting temperature of 200° C. and a shearing speed of 1000 l/sec at a temperature of from a temperature lower by 30° C. than a one minute decomposition half-life temperature $T_{1/2}$ of the cross-linking agent (C) to a temperature higher by 30° C. than the $T_{1/2}$ to the extent of a cross-linking degree of not less than 30%, in which process particularly preferably the cross-linking agent (C) is separately added more than one time.

The thermoplastic polymer composition in accordance with the present invention is superior in mechanical strength, appearance and moldability.

The composition in accordance with the present invention can be extensively applied for various uses such as car parts, car interior materials, air-bag covers, machine parts, electrical parts, cables, hoses, belts, toys, miscellaneous goods, daily necessaries, building materials, sheets and films, and can play a major role in industry.

PREFERRED EMBODIMENT OF THE INVENTION

The composition in accordance with the present invention comprises a cross-linked olefin thermoplastic polymer composition comprising a cross-linking rubber like polymer (A) having a specific rubber state and an olefin resin (B).

Herein, it is important that (A) has a weight average particle diameter of from 0.01 to 3 μm. When the weight average particle diameter is less than 0.01 μm, the mechanical strength decreases. When it exceeds 3 μm, the appearance markedly deteriorates. In order to obtain such a rubber state, it is important that a melt viscosity ratio between (A) and (B) is close to each other, the cross-linking is carried out under a high shearing power and a sudden cross-linking is prevented. For this reason, it is preferred to carry out the cross-linking at a temperature having a specific relation to a decomposition half-life temperature of the cross-linking agent (C). In addition thereto, it is further preferred that (C) is separately added to carry out the cross-linking one after another. In addition thereto, the most preferably, (A) and (B) are melt-blended with each other, and thereafter (C) is added under melting condition to complete cross-linking, thereby obtaining superiority in appearance, mechanical strength and moldability. The present invention has been completed based on such a finding.

Respective components used in the present invention are illustrated in detail as follows.

Cross-linking Rubber like Polymer (A)

In the present invention, it is preferred that the cross-linking rubber like polymer (A) has a glass transition temperature (Tg) of not higher than −10° C. Examples of such a cross-linking rubber like polymer are diene rubber such as polybutadiene, poly(styrene-butadiene) and poly(acrylonitrile-butadiene) and saturated rubber obtained through hydrogenation of the above-said diene rubber, isoprene rubber, chloroprene rubber, acrylic rubber such as polybutyl acrylate, ethylene-propylene copolymer rubber, ethylene-propylene-non-conjugated diene ternary copolymer rubber (EPDM), ethylene-octene copolymer rubber and thermoplastic elastomer containing the above-said rubber components.

Mooney viscosity (ML) of (A) measured at 100° C. using ISO 289-1985(E) is preferably from 20 to 150, and more preferably from 50 to 120.

Melt index of (A) preferably ranges from 0.01 to 100 g/10 min (190° C., 2.16 kgf (0.212 Pa)), and more preferably from 0.2 to 10 g/10 min. It is not desirable that the melt index exceeds 100 g/10 min, because cross-linking of the composition becomes insufficient. It is not desirable that it is less than 0.01 g/10 min, because flowability is not good and processability decreases.

In the present invention, one of preferred polymers as the cross-linking rubber like polymer (A) is an ethylene-α-olefin copolymer. Particularly, a copolymer between ethylene and an α-olefin having 3 to 20 carbon atoms is preferred. More preferred is that of an α-olefin having 3 to 12 carbon atoms. Specific examples of the α-olefin are propylene, butene-1, pentene-1, hexene-1,4-methylpentene-1, heptene-1, octene-1, nonene-1, decene-1, undecene-1 and dodecene-1. Of these, the most preferred are propylene, butene-1, hexene-1,4-methylpentene-1 and octene-1. If desired, it is permitted that the ethylene-α-olefin copolymer contains an unsaturated bond-carrying monomer unit. Examples of the unsaturated bond-carrying monomer are conjugated dienes such as butadiene and isoprene, non-conjugated dienes such as 1,4-hexadiene, cyclic dienes such as dicyclopentadiene and norbornene derivatives, and acetylenes. Of these, preferred are ethylidenenorbornene (ENB) and dicyclopentadiene (DCP).

The ethylene-α-olefin copolymer can be produced preferably using a conventional metallocene catalyst.

Generally speaking, the metallocene catalyst comprises a cyclopentadienyl derivative of a IV group metal such as titanium and zirconium and a co-catalyst and has a high activity as a polymerization catalyst. Moreover, as compared with a Ziegler catalyst, a molecular weight distribution of the polymer obtained is narrower and a distribution of the α-olefin having 3 to 20 carbon atoms, namely, the comonomer in the copolymer, is more uniform.

It is preferred that the ethylene-α-olefin copolymer has an α-olefin copolymerization proportion of from 1 to 60% by weight, more preferably from 10 to 50% by weight, and the most preferably from 20 to 45% by weight. When the α-olefin copolymerization proportion exceeds 60% by weight, hardness of the composition and tensile strength thereof largely deteriorate. When it is less than 1% by weight, flexibility and mechanical strength decrease.

It is preferred that density of the ethylene-α-olefin copolymer ranges from 0.8 to 0.9 g/cm$^3$. Using a copolymer having a density within such a range, a polymer composition having superior flexibility and low hardness can be obtained.

Further, it is desirable that the ethylene-α-olefin copolymer has a long chain branched. Owing to the presence of the long chain branched, it becomes possible to lessen the density without detriment to the mechanical strength for the α-olefin copolymerization proportion (% by weight), and thereby, a rubber like polymer having low density, low hardness and high strength can be obtained. Examples of the ethylene-α-olefin copolymer having a long chain branched are as described in, for example, U.S. Pat. No. 5,278,272.

Additionally, it is desirable that ethylene-α-olefin copolymer has a melting temperature peak of not lower than ambient temperature measured according to DSC. When it has such a melting temperature peak, a state is made stable within a temperature range not higher than the melting temperature, and as a result superior handling and little stickiness can be attained.

In the present invention, another one of preferred polymers as the cross-linking rubber like polymer (A) is hydrogenated rubber. The hydrogenated rubber comprises rubber of a homopolymer formed from a conjugated diene monomer, and rubber of a copolymer (particularly a random copolymer) formed from the conjugated diene monomer and an aromatic vinyl monomer, wherein a hydrogenation percent to all double bonds is not lower than 50%. Particularly, it is preferred to use rubber, in which not less than 50% of all olefinic double bonds of the homopolymer and/or the copolymer having double bonds on both a main chain and a side chain are hydrogenated.

In obtaining the above-mentioned hydrogenated rubber, if desired, it is permitted to copolymerize a monomer copolymerizable with the conjugated diene such as olefin monomers, methacrylate monomers, acrylate monomers, unsaturated monomers and vinyl chloride monomers.

Herein, examples of the conjugated diene are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene. Of these, preferred are 1,3-butadiene, isoprene and 1,3-pentadiene, and the most preferred are 1,3-butadiene and isoprene.

Examples of the aromatic vinyl monomer are styrene, α-methylstyrene, p-methylstyrene, t-butylstyrene, divinylbenzene, N,N-dimethyl-p-aminoethylstyrene and vinylpiridine. Of these, preferred are styrene and α-methylstyrene. The above-mentioned aromatic vinyl monomer may be used singly or in combination of two or more. A content of the aromatic vinyl monomer in the hydrogenated rubber is preferably from 0 to 80% by weight, more preferably from 0 to 50% by weight, and the most preferably from 0 to 30% by weight.

In the hydrogenated rubber, the vinyl bond of the conjugated diene monomer portion before hydrogenation may exist uniformly in the molecule, may increase or decrease along the molecule chain, or may be contained in several blocks different from one another in a vinyl bond content. It is preferred that the aromatic vinyl monomer or the above-mentioned monomer copolymerizable with the conjugated diene, if contained, is bound randomly to the above-mentioned conjugated diene monomer portion. However, it is permitted to contain the aromatic vinyl monomer or other monomers in a block form. A content of the block aromatic vinyl polymer is preferably not more than 20% by weight, and more preferably not more than 10% by weight, based on the weight of the whole aromatic vinyl monomer.

The olefinic double bond in rubber to be hydrogenated is hydrogenated to the extent of not less than 50%, preferably not less than 90%, and more preferably not less than 95%. In addition, it is preferred that a remaining double bond in the main chain is not more than 5% and that in the side chain is not more than 5%. Preferred examples of such hydrogenated rubber are rubber like polymers obtained by partially or completely hydrogenating diene rubber such as polybutadiene, poly(styrene-butadiene), poly(acrylonitrile-butadiene), polyisoprene and polychloroprene.

Such hydrogenated rubber can be obtained by partially hydrogenating the above-mentioned polymer and/or copolymer in a conventional hydrogenation manner. For example, a hydrogenation process with use of a triisobutylboran catalyst as described in F. L. Ramp, et al. J. Amer. Chem. Soc., 83, 4672 (1961), a hydrogenation process with use of toluene sulfonyl hydrazide as described in Hung Yu Chen, J. Polym. Sci. Polym. Letter Ed., 15. 271 (1977), and a hydrogenation process with use of an organic cobalt-organic aluminum catalyst or an organic nickel-organic aluminum catalyst as described in JP-B-42-8704 are enumerated. Here, particularly preferred are a hydrogenation process comprising using a catalyst by which hydrogenation can be carried out under mild conditions of low temperature and low pressure as described in JP-A-59-133203 and JP-A-60-220147, and a process comprising contacting with hydrogen in an inert organic solvent in the presence of a catalyst comprising a bis(cyclopentadienyl)titanium compound and a hydrocarbon compound having a sodium, potassium, rubidium or cesium atom as described in JP-A 62-207303.

A 5% by weight styrene solution viscosity of the hydrogenated rubber at 25° C. (5% SV) is preferably within a range of from 20 to 300 centipoise (cps). A particularly preferable range is from 25 to 150 cps.

Further, it is preferred that the hydrogenated rubber has crystallinity. An endothermic peak calorie, which is an index of the crystallinity, can be controlled by addition of a polar compound such as tetrahydrofuran or by control of polymerization temperature. The endothermic peak calorie can be decreased with increase in the polar compound or lowering in the polymerization temperature to increase a 1,2-vinyl bond.

In the present invention, several kinds of (A) may be used in combination. In such a case, it is possible to further improve the processability.

In the present invention, a content in (A) of a polymer having a molecular weight of not more than 150,000 calibrated with polystyrene standard is preferably not more than 30%, more preferably not more than 25%, much more preferably not more than 20%, extremely preferably not more than 15%, and the most preferably not more than 10%. When the content is not more than 30%, the cross-linking property markedly increases to improve mechanical strength, appearance, feeling, abrasion resistance and oil resistance.

In the present invention, as a process for controlling the content in (A) of a polymer having a molecular weight of not more than 150,000 calibrated with polystyrene standard, a process comprising increasing the whole molecular weight so as to make a portion having a molecular weight of not more than 150,000 not more than 30%, a process comprising removing the portion having a molecular weight of not more than 150,000 through an operation such as extraction, and a process, according to which polymerization is carried out using a polymerization catalyst not as to produce the portion having a molecular weight of not more than 150,000, are enumerated.

Olefin Resin (B)

In the present invention, the olefin resin (B) is a polymer resin containing one or more than one unit of ethylene and/or α-olefin having 2 to 20 carbon atoms. Particularly preferred are propylene resins.

Examples of the propylene resins used the most suitably in the present invention are isotactic propylene homopolymer resins and isotactic copolymer resins (including block and random ones) formed from propylene and other α-olefins such as ethylene, butene-1, pentene-1 and hexene-1.

In the present invention, among (B), preferred are a cross-linking olefin resin (B-1) including a propylene random copolymer resin such as a random copolymer resin of ethylene and a main component of propylene, and a combination of a decomposing olefin resin (B-2) including a propylene block copolymer resin and a homopolypropylene resin, with the cross-linking olefin resin (B-1). When two kinds of olefin resins, namely the cross-linking olefin resin and the decomposing olefin resin are used in combination, as described above, the appearance and mechanical strength can be further improved.

As an example of (B-1), a random copolymer resin of ethylene and a main component of propylene can be enumerated. In a main chain of such a polymer, there exists an ethylene component, at which point the cross-linking occurs, and as a result, the resin can exhibit characteristic features peculiar to the cross-linking olefin resin.

(B-2) mainly comprises an α-olefin having 3 or more carbon atoms, and it is preferred that a main chain of the polymer contains no ethylene unit. However, in the case where the ethylene-olefin copolymer exists as a dispersed phase like the propylene block copolymer resin, the resin can exhibit characteristic features peculiar to the decomposing olefin resin.

It is permitted to use a combination of several numbers of (B-1) and a combination of several numbers of (B-2) as (B).

The random copolymer resin of an α-olefin and a main component of propylene, which is the most preferable among those of (B-1), can be produced according to a high pressure method, a slurry method, a gas phase method, a bulk method or a solution method. As a polymerization catalyst, a Ziegler-Natta catalyst, a single site catalyst and a metallocene catalyst are preferred. Particularly when the composition distribution and molecular weight distribution are required to be narrow, it is recommendable to carry out a random copolymerization using a metallocene catalyst.

European Patent No. 0 969 043 A1 and U.S. Pat. No. 5,198,401 disclose a specific example of a process for producing the random copolymer resin, wherein liquefied propylene is introduced into a reactor equipped with a stirrer, thereafter a catalyst is added to a gas phase or a liquid phase through a nozzle, successively an ethylene gas or an α-olefin is introduced into the gas phase or the liquid phase in the reactor, and reaction temperature and reaction pressure are controlled under such conditions that propylene is refluxed. A polymerization speed is controlled by a catalyst concentration and reaction temperature, and a copolymerization composition is controlled by an amount to be added of ethylene or the α-olefin.

A melt index of the olefin resin suitably used in the present invention is preferably within a range of from 0.1 to 100 g/10 min (230° C., 2.16 kgf (0.212 Pa)). It is not desirable that it exceeds 100 g/10 min, because the thermoplastic polymer composition becomes insufficient in its heat resistance and mechanical strength. It is not desirable that it is less than 0.1 g/10 min, because flowability becomes inferior and molding processability decreases.

In the present invention, a content of (A) in 100 parts by weight of a polymer composition of (A) and (B) is preferably from 1 to 99% by weight, more preferably from 10 to 90% by weight, and the most preferably from 20 to 80% by weight. It is not desirable that the (A) component is less than 1% by weight, because the composition is insufficient in its mechanical strength and flexibility. It is not desirable that the component (A) exceeds 99% by weight, because the composition is lessened in its thermoplastic property.

Cross-linking Agent (C)

It is recommendable that the olefin polymer composition in accordance with the present invention is cross-linked with a cross-linking agent (C). Such a (C) contains a cross-linking initiator (C-1) as an essential component, and if desired, a polyfunctional monomer (C-2) and a monofunctional monomer (C-3). The said (C) is used in an amount of from 0.001 to 10 parts by weight, and preferably from 0.005 to 3 parts by weight, based on 100 parts by weight of (A) and (B). When it is less than 0.001 part by weight, cross-linking may be insufficient, and when it exceeds 10 parts by weight, the resulting composition may decrease in its appearance and mechanical strength.

Here, the cross-linking initiator (C-1) includes a radical initiator such as an organic peroxide and an organic azo compound. Specific examples thereof are dialkyl peroxides such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane, peroxyketals such as n-butyl-4,4-bis(t-butylperoxy)valerate, di-t-butyl peroxides, dicumyl peroxide, t-butylcumyl peroxide, α,α'-bis(t-butylperoxy-m-isopropyl)benzene, α,α'-bis(t-butylperoxy)diisopropylbenzene, 2,5-dimethyl-2,5-bis(t-butylperoxy)hexane and 2,5-dimethyl-2,5-bis(t-butylperoxy)hexyne-3; acetyl peroxide, isobutylyl peroxide, octanoyl peroxide, decanoyl peroxide, lauroyl peroxide, 3,5,5-trimethylhexanoyl peroxide, diacyl peroxides such as 2,4-dichlorobenzoyl peroxide and m-toluoyl peroxide, and peroxy esters such as t-butylperoxy acetate, t-butylperoxy isobutylate, t-butylperoxy-2-ethylhexanoate, t-butylperoxy laurate, t-butylperoxy benzoate, di-t-butylperoxy isophthalate, 2,5-dimethyl-2,5-di(benzoylperoxy)hexane, t-butylperoxy maleate, t-butylperoxy isopropyl carbonate and cumylperoxy octate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl peroxide.

Among these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

A content of the above-mentioned (C-1) in the (C) component is preferably from 1 to 80% by weight, and more preferably from 10 to 50% by weight. When it is less than 1% by weight, cross-linking is insufficient, and when it exceeds 80% by weight, the mechanical strength decreases.

In the present invention, the polyfunctional monomer (C-2), one component in the cross-linking agent (C), has preferably a functional group having radical polymerization ability, particularly a vinyl group. A number of the functional group is 2 or more. Particularly those having 3 or more functional groups are effective when combined with (C-3). Specific examples of the (C-2) are divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenymaleimide, allyl methacrylate, N,N'-m-phenylenebismaleimide, diallyl phthalate, tetraallyl oxyethane and 1,2-polybutadiene. Particularly triallyl isocyanurate is preferred. It is permitted to use more than one polyfunctional monomer in combination.

A content of the above-mentioned (C-2) in the (C) component is preferably from 1 to 80% by weight, and more preferably from 10 to 50% by weight. When it is less than 1% by weight, cross-linking is insufficient, and when it exceeds 80% by weight, the mechanical strength decreases.

The monofunctional monomer (C-3), one component of the cross-linking agent (C) used in the present invention, includes a vinyl monomer added for the purpose of controlling a cross-linking speed. Preferred is a vinyl monomer having radical polymerization ability. Examples thereof are aromatic vinyl monomers, unsaturated nitrile monomers such as acrylonitrile and methacrylonitrile, ester monomers such as an acrylic acid ester monomer and a methacrylic acid ester monomer, unsaturated carboxylic acid monomers such as an acrylic acid monomer and a methacrylic acid monomer, unsaturated carboxylic acid anhydrides such as a maleic anhydride monomer, and N-substituted maleimide monomers.

A content of the above-mentioned (C-3) in the (C) component is preferably from 1 to 80% by weight, and more preferably from 10 to 50% by weight. When it is less than 1% by weight, cross-linking is insufficient, and when it exceeds 80% by weight, the mechanical strength decreases.

In the present invention, the most preferred combination for the cross-linking agent (C) is that between 2,5-dimethyl-2,5-bis(t-butylperoxy)hexane (a commercial name of PERHEXA 25B, manufactured by NOF Corporation) or 2,5-dimethyl-2,5-bis(t-butylperoxy)hexyn-3 (a commercial name of PERHEXYN 25B, manufactured by NOF Corporation) as the cross-linking initiator, and triallyl isocyanurate (TAIC, manufactured by 日本化成) as the polyfunctional monomer, which combination is superior in mechanical strength and retention of a softening agent (D), if used.

Softening Agent (D)

As the above-mentioned (D), preferred are process oil comprising paraffin, naphthene or aromatic hydrocarbons.

Particularly preferred are process oil comprising a main component of paraffin hydrocarbons and process oil comprising a main component of naphthene hydrocarbons from a viewpoint of compatibility with rubber. From a viewpoint of heat and light stability, a content of the aromatic hydrocarbons in the process oil is preferably not more than 10%, more preferably not more than 5%, and the most preferably not more than 1%, in terms of a carbon number ratio as prescribed in ASTM D2140-97.

The component (D) is used for controlling hardness and flexibility of the composition in an amount of from 5 to 500 parts by weight, and preferably from 10 to 150 parts by weight, based on 100 parts by weight of (A) and (B). It is not desired that the amount is less than 5 parts by weight, because flexibility and processability become insufficient, and it is not desired that it exceeds 500 parts by weight, because oil bleeding becomes remarkable.

Thermoplastic resin (E) other than (B)

In the present invention, a thermoplastic resin (E) other than (B) may be blended. (E) is not particularly limited as far as it is dispersible with either (A) or (B). Examples thereof are polystyrenes, polyphenylene ethers, polyvinyl chlorides, polyamides, polyesters, polyphenylenesulfides, polycarbonates and polymethacrylates, which may be used singly or in combination of two or more.

In the present invention, a content of (E) is preferably from 1 to 99 parts by weight, more preferably from 10 to 90 parts by weight, and the most preferably from 20 to 80 parts by weight, based on 100 parts by weight of the polymer composition of (A) and (B).

In the present invention, when abrasion resistance is required, if desired, a polyorganosiloxane having kinematic viscosity of not less than 5000 centistoke ($5 \times 10^{-3}$ m$^2$/sec) at 25° C. measured according to JIS-K2410 may be added.

The above-mentioned polyorganosiloxane is not particularly limited as far as it is viscous like starch syrup or gum and is a polymer having an alkyl, vinyl and/or allyl group-substituted siloxane unit. Of these, the most preferred is polydimethylsiloxane.

The kinematic viscosity (25° C.) of the polyorganosiloxane used in the present invention is not less than 5,000 cs ($5 \times 10^{-3}$ m$^2$/sec), preferably not less than 10,000 cs ($1 \times 10^{-2}$ m$^2$/sec) and less than 10,000,000 cs (10 m$^2$/sec), and the most preferably not less than 50,000 cs (0.05 m$^2$/sec) and less than 2,000,000 cs (2 m$^2$/sec).

In the present invention, the polyorganosiloxane is added in an amount of preferably from 0.01 to 20 parts by weight, more preferably from 0.1 to 10 parts by weight, and the most preferably from 0.5 to 5 parts by weight, based on 100 parts by weight of the sum of (A) and (B).

When the polymer composition in accordance with the present invention, particularly the polymer composition comprising (A) and (B) is required to have high temperature rubber characteristics such as high temperature permanent compression set and high temperature mechanical strength, it is necessary to control crystallinity of (B) in the composition. It is preferred that crystallization temperature and crystallization calorie of (B) measured according to differential scanning calorimetry (DSC) as defined below are preferably within a range of from 110 to 150° C., and from 30 to 200 J/g, respectively.

Here, the crystallization temperature and crystallization calorie of (B) in the composition are measured according to differential scanning calorimetry (DSC). More specifically, using a thermal analysis apparatus DSC 50, manufactured by Shimadzu Corporation, 5 mg of a sample is treated under nitrogen atmosphere in a manner such that temperature is raised from ambient temperature at a rate of 30° C./min, and immediately after reaching 230° C., the temperature is lowered to 50° C. at a rate of 5° C./min. From a crystallization peak detected at this stage, the crystallization temperature and the crystallization calorie were obtained. Here, a peak top temperature (° C.) was taken as the crystallization temperature, and the crystallization peak calorie (J/g) was calculated from a peak area surrounded with a curve showing a calorie variation shifted to the base line. The above-mentioned curve includes any of a broad curve and a sharp curve. In order to find the peak top temperature, a straight line is drawn in parallel to the base line, and a temperature at a crossing in a tangent thereof with the curve showing a calorie variation is taken as the peak top temperature.

In the present invention, how to control the crystallinity is not limited. There are exemplified a process wherein an olefin resin having high crystallinity is used to obtain the composition in accordance with the present invention, and a process wherein a crystallinity improving agent is blended with an olefin resin having low crystallinity to obtain the composition in accordance with the present invention.

Typical examples of the above-mentioned crystallinity improving agent are a crystal nucleating agent classified into phosphoric acid esters, sorbitols and carboxylic acid salts and an inorganic filler.

Specific examples of the above-mentioned crystal nucleating agent are sodium 2,2'-methylenebis(4,6-di-t-butylphenyl)phosphate, bis(p-methylbenzylidene)sorbitol and bis(p-ethylbenzylidene)sorbitol. Specific examples of the above-mentioned inorganic filler are single substances such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide and their complexes (alloy), hydrates of an inorganic metal compound such as hydrates of aluminum hydroxide, magnesium hydroxide, dolomite, hydrotalcite, zeolite, calcium hydroxide, barium hydroxide, basic magnesium carbonate, zirconium hydroxide and tin hydroxide, zinc borate, zinc metaborate, barium metaborate, zinc carbonate, magnesium carbonate, calcium carbonate, barium carbonate, kaolin, montmorillonite, bentonite, clay, mica and talc. Of these, preferred are plate like fillers, and particularly preferred are talc, mica and kaolin.

The above-mentioned crystallinity improving agent is added in an amount of preferably from 0.01 to 200 parts by weight, more preferably from 0.1 to 150 parts by weight, extremely preferably from 0.1 to 100 parts by weight, and the most preferably from 0.1 to 50 parts by weight, based on 100 parts by weight of the composition of (A) and (B).

Further, the composition in accordance with the present invention may contain an inorganic filler and a plasticizer, as far as its characteristic feature is not impaired. Examples of the inorganic filler used herein are calcium carbonate, magnesium carbonate, silica, carbon black, glass fiber, titanium oxide, clay, mica, talc, magnesium hydroxide and aluminum hydroxide. Examples of the plasticizer are polyethylene glycol and phthalic acid esters such as dioctyl phthalate (DOP). In addition, other additives such as organic and inorganic pigments, heat stabilizers, antioxidants, ultraviolet absorbers, light stabilizers, flame retarders, silicone oil, anti-blocking agents, foaming agents, anti-static agents and anti-microbial agents may be suitably used.

A particle diameter of the rubber like polymer in the present invention can be controlled by selecting a melt viscosity ratio between (A) and (B), varying a kind and addition amount of the cross-linking initiator and the cross-linking auxiliary, or selecting reaction temperature and a reaction manner. In order to obtain a small particle, preferably a uniform spherical particle, it is necessary to control a cross-linking speed under high shear. When the cross-linking initiator and the cross-linking auxiliary are added in an undue amount, or unduly high active cross-linking initiator and cross-linking auxiliary or unduly high temperature conditions are applied, the rubber like polymer aggregates to fail to meet requirements of the present invention.

More specifically speaking, for the purpose of controlling the particle diameter of the rubber like polymer, four processes are given as follows.

(1) A combination is selected so as to make a melt viscosity ratio $\eta_A/\Theta_B$ between (A) and (B), where $\eta_A$ and $\eta_B$ are measured under conditions of a melting temperature of 200° C. and a shearing speed of 1000 l/sec, from 0.5 to 5.

(2) The amount of the cross-linking initiator or the cross-linking auxiliary is reduced, and the reaction is carried out for a long period of time at a temperature as lower as possible but not lower than a decomposition temperature of the cross-linking initiator.

(3) The polyfunctional monomer and the monofunctional monomer are used at the same time as the cross-linking auxiliary.

(4) (A) is impregnated with a small amount of the softening agent (D) in advance, and then the cross-linking initiator and the cross-linking auxiliary are blended with (A), so that the cross-linking reaction proceeds mildly, and as a result, it is possible to produce a small and uniform spherical particle.

Further, in order to obtain superiority in appearance and mechanical strength of the rubber like polymer in the present invention, it is preferred that a melting temperature satisfies the following relation expressions. That is, a first melt kneading is carried out at a melting temperature $T_1$ (° C.), and a successive melt kneading is carried out at a melting temperature $T_2$ (° C.). Particularly, in a melt extrusion machine having a length of a screw L from a main feeding port in the direction of a die, the first melt kneading is carried out at a melting temperature $T_1$ (° C.) in an extrusion machine zone within a range of from 0.1 L to 0.5 L from the main feeding port, and the successive melt kneading is carried out at a melting temperature $T_2$ (° C.) in a remaining extrusion machine zone.

Here, it is particularly preferred that $T_1$ is from 150 to 250° C., and $T_1$ and $T_2$ in each zone of the melting extrusion machine may be uniform, or may have a temperature gradient. Particularly, it is extremely preferred that cross-linking is carried out within a range of from a temperature lower by 30° C. than $T_{1/2}$ to a temperature higher by 30° C. than $T_{1/2}$ to the extent of a cross-linking degree of not less than 30%.

$T_{1/2}$: one minute decomposition half-life temperature of (C) (° C.)

$T_{1/2}-100<T_1<T_{1/2}+40$ $T_1+1<T_2<T_1+200$

By combining the above-described cross-linking rubber like polymer (A), olefin resin (B) and softening agent (D) in a specific composition ratio, the composition in accordance with the present invention can be improved in balance of mechanical strength, flexibility and processability, and used suitably.

In producing the composition in accordance with the present invention, there can be applied a conventional method using Banbury mixer, a kneader, a single screw extruder and a twin screw extruder, which have been used for the production of a usual resin composition and a rubber composition. Particularly, in order to attain dynamic cross-linking effectively, it is preferred to use a twin screw extruder. The twin screw extruder is more suitable to disperse (A) and (B) uniformly and finely and cause cross-linking reaction with the aid of other components, thereby continuously producing the composition in accordance with the present invention.

More specifically, the composition in accordance with the present invention can be produced through the following processing steps. That is, (A) and (B) are thoroughly blended and then fed into a hopper (a main feeding port) of an extruder. (C) may be added from the main feeding port together with (A) and (B), or may be added from the side feeding port. Further, (D) may be added from the side feeding port. Alternatively, in adding, (D) may be divided into two parts, namely a part from the main feeding port and another part from the side feeding port. A part of (A) and (B) may be added from the side feeding port. In the course of kneading under heat melting in the extruder, the cross-linking reaction between (A) and (C) is caused, and (D) is further added thereto and melt-kneaded therewith, thereby completing the cross-linking reaction and kneading dispersion. When taken out of the extruder, the composition in accordance with the present invention can be obtained in a pellet form.

In a particularly preferred melt extrusion method, there is used a twin screw extruder having a screw length of L from a material feeding mouth in the direction of a die and L/D of from 20 to 100, wherein D is an inner diameter of a cylinder. The twin screw extruder has several supplying means including a main feeding port and one or several side feeding port, which are placed at different positions in their distance from the top portion of the extruder, and also has kneading means between said several supplying ports, wherein respective kneading means have a length of preferably from 3D to 10D.

The twin screw extruder which is one of production apparatuses used in the present invention may be a co-rotating twin screw extruder or a counter-rotating twin screw extruder. With respect to the degree of intermeshing of the screw, any of non-intermeshing type, partially intermeshing type and completely intermeshing type may be applied. In order to obtain a uniform resin at a low temperature applying a low shear, it is preferred to use a co-rotating and partially intermeshing type screw. When stronger kneading is required, a co-rotating and completely intermeshing type screw is preferred.

In the process for producing the composition in accordance with the present invention, it is more preferred to satisfy the following kneading degree, $M=(\pi^2/2)(L/D)D^3(N/Q)$ $10\times10^6 \leq M \leq 1000\times10^6$ wherein L (mm) is a length of a screw from a main feeding port in the direction of a die, D (mm) is an inner diameter of a cylinder, Q (kg/h) is an output, and N (rpm) is a rotating number of a screw.

Namely, it is important that a kneading degree M $(\pi^2/2)(L/D)D^3(N/Q)$ satisfies $10\times10^6 \leq M \leq 1000\times10^6$. When M is less than $10\times10^6$, a rubber particle is enlarged and aggregated, thereby deteriorating appearance. When M exceeds 1000×10⁶, mechanical strength decreases owing to an undue shearing power.

The most preferred process for producing the composition in accordance with the present invention comprises melt-blending (A) and (B), and thereafter adding (C) thereto under melting condition, thereby performing cross-linking. According to the above-mentioned production process, a huge particle having an average particle diameter exceeding 100 μm as defined below is produced in an extremely small number.

Here, a number of a dispersion of (A) in the composition is measured according to the following method.

One gram of the composition is molded using a compression molding machine, thereby obtaining a sheet having a thickness of about 100 μm, and a center of the sheet is cut down to obtain a square sheet having a side of 3 cm. An all-sight photograph is obtained by taking a picture directly over the scare using a reflex digital HD microscope (VH-7000, manufactured by Keyence Co.), and a number of the dispersed particles having a size of not less than 100 μm per 1 mm² appearing on the photograph is counted. The number thus obtained is taken as a number/mm² of dispersed particles having a size of not less than 100 μm dispersed in the composition.

Incidentally, an area S of each dispersed particle is obtained, and thereby, $(4S/\pi)^{0.5}$ is taken as a particle diameter of each dispersed particle.

It is general that cross-linking degree must be increased to improve mechanical strength, and for that reason, the cross-linking agent is used in an increased amount. However, increase in the cross-linking agent promotes a rapid cross-linking reaction and results in production of aggregates (huge particles) of (A) in a large amount, thereby markedly deteriorating appearance and mechanical strength. The present inventors have found a fact that when the cross-linking in the above-mentioned production process is effected with use of the cross-linking agent (C), (C) is separately added to carry out cross-linking one after another, thereby, a number of the dispersed particles of (A) having a particle diameter of not less than 100 μm in the composition becomes not more than 1/mm² on the average in measurement for the surface of the sheet of the composition, and as a result, the mechanical strength, appearance and moldability can be improved.

One embodiment of such a production process is as follows. (A) and (B) are introduced through the main feeding port, followed by melt kneading in a first half of an extruder, a part of the cross-linking agent (C) is added thereto through the first side feeding port, followed by melt kneading, thereby effecting dynamic cross-linking, and a remaining cross-linking agent is further introduced into the extruder from the second feeding port, followed by melt kneading, thereby completing the dynamic cross-linking. Here, the more in number of separation of (C), the better for inhibition of a rapid cross-linking. As compared with addition of all amount of (C) at a first stage, even by separation addition of two times, appearance, flowability, mechanical strength and quality stability can be far improved. For example, after melt-blending (A) and (B), a part of (C) is fed through the side feeding port, and a remaining (C) is separately fed through more than one side feeding port into the extruder, while continuing melt-kneading. Here, in melt-blending (A) and (B), if desired, (C-2) and (C-3), which are inert or weak to the cross-linking reaction among those of (C), may be melt-blended at the same time. As a method for feeding (C), (C) may be directly fed, or preferably dissolved in the softening agent (D) to facilitate a liquid feeding.

Alternatively, in feeding, (C) may be impregnated in a non-melting filler. Further, if desired, it is permitted to feed (A) and/or (B) in each separate manner.

Here, in separately adding (C) to carry out the cross-linking one after another, it is preferred that the cross-linking is carried out through a first time addition of (C) to the extent of a cross-linking degree of from 5 to 45% as defined below, and through a successive addition of (C) to the extent of a cross-linking degree of 50% or more.

The cross-linking degree of (A) is measured according to the following method.

A weight $W_0$ of (A) in the composition is previously measured, thereafter the composition is refluxed in 200 ml of xylene for 20 hours, the solution is removed by filtration, the resulting composition swollen is vacuum-dried at 100° C., and weighed to know a weight ($W_1$). The cross-linking degree is calculated by the following expression.

$$\text{Cross-linking degree} = (W_1/W_0) \times 100\ (\%)$$

A twin screw extruder suitably used for producing the composition in accordance with the present invention has a main feeding port and at least one side feeding port, which are placed at different positions from each other in distance from the top portion of the extruder, and has at least three zones, Zones I to III, in the order named from the main feeding port, each zone length being from 0.05 to 0.5L, wherein (A) and (B), and if desired, (C-2) and/or (C-3), which are fed through the main feeding port are melt-blended with one another in Zone I, successively a part of (C) fed through the one side feeding port is melt-blended therewith in Zone II, and further a remaining (C) fed through the other side feeding port is melt-blended therewith in Zone III.

In the present invention, when the softening agent (D) and/or the solid matter are (is) additionally used, it is preferred to add them (it) after addition of (C) and melt-blended therewith. In such a case, there is used a twin screw extruder further having at least one zone having a length of from 0 to 0.4L in the back of Zones I to III, wherein (A) and (B), and if desired other components are melt-blended in the additional zone, and (D) is melt-blended in said zone or the other successive zone, followed by removal of a volatile matter.

The rubber composition thus obtained can be molded into various molded products in an arbitrary molding manner. Injection molding, extrusion molding, compression molding, blow molding, calendering and foaming can be suitably applied.

The present invention is explained in more detail with reference to Examples and Comparative Examples, which are not intended to limit the scope of the present invention. In these Examples and Comparative Examples, test methods used for the evaluation of various physical properties are as follows.

1. Particle Diameter of Rubber like Polymer

A weight average particle diameter of the rubber like polymer is obtained in a manner such that each average particle diameter of 500 rubber like polymers appearing in a photograph obtained by taking a picture with a transmission electron microscope according to an ultra-slice method is measured, followed by calculation with the following expression. An arithmetic mean between a maximum diameter d1 (particle length) of each particle and a minimum diameter d2 (particle breadth) thereof is taken as an average particle diameter of each particle. Further, a huge particle having an average particle diameter exceeding 100 μm is excluded from the particle defined in the present invention.

$$\text{Weight average particle diameter} = \Sigma Ni \cdot Di^4 / \Sigma Ni \cdot Di^3$$

Here, Ni is a number of a rubber like polymer particle having a particle diameter of Di.

Further, a ratio d1/d2 between the particle length d1 and the particle breadth d2 is measured for 500 polymers, and its number average is obtained.

Incidentally, in calculating the average particle diameter of the molded product, when a concentration of the rubber like polymer in the molded product is low, it is possible to calculate the average particle diameter using the as-molded product or a molded product relaxed in its directional characteristics according to a hot-press molding. However, when a concentration of the rubber like polymer in the molded product is high, the rubber particle is placed one over the other, and therefore it is not possible to exactly calculate individual particle diameters of the rubber like polymer. In such a case, the molded product is cut down and diluted with an olefin resin by means of, for example, a plastomil, wherein a rubber like polymer concentration is preferably not more than 20%. Successively, the resultant is press-molded to obtain a sheet, and using the sheet, the average particle diameter can be measured.

2. Hydrogenation Percent of (A) (%)

It was measured according to a usual NMR method.

3. Melt Viscosity Ratio

Each shear melt viscosity η of (A) and (B) is measured under conditions of a melting temperature of 200° C. and shearing speed of 1000 l/sec using Capillograph 1C-3A manufactured by TOYO SEIKI SEISAKUSHO, followed by calculation of the ratio $\eta_A/\eta_B$.

4. Vacuum Moldability

In a mold of a cuboid form having a square bottom having a side of 15 cm and a depth of 5 cm, a sheet having a thickness of 1 mm was placed so as to contact therewith. The sheet was heated using an infrared heater until a surface of the sheet reached 140° C., and then molded under vacuum to obtain a molded product. Shape-repeatability and transferability of the molded product obtained were visually evaluated on the basis of the following criteria.

⊚: Extremely good shape-repeatability and transferability

○: Good

Δ: Good, but the shape-repeatability and transferability at a corner portion is somewhat bad X: Bad On the other hand, using Capillograph 1C-3A manufactured by TOYO SEIKI SEISAKUSHO as a capillary meter, melt tensile strength and melt elongation of the molten polymer are measured.

More specifically, under conditions mentioned below, tensile speed is varied, and melt tensile strength is measured at varied tensile speed. A tensile speed at which end breakage is caused is referred to as an index of the melt elongation. These correspond to the vacuum moldability.

land length: 10 mm orifice caliber: 1 mm melting temperature: 200° C.

cross-head speed: 50 mm/min

5. Elongation at Break (Tensile Strength) [MPa]

It is evaluated at 23° C. according to JIS K6251.

6. Appearance

A surface of the sheet is observed to visually evaluate the appearance on the basis of the following criteria.

⊚: Extremely good

○: Good

Δ: Good, but somewhat sandy

X: Wholly sandy and no gloss

On the other hand, using Gloss Meter model GM-26D manufactured by Murakami Color Research Laboratory, a gloss value of the sheet surface (at an incidence angle of 60°) is measured.

Respective components used in Examples and Comparative Examples are as follows.

(a) Cross-linking Rubber like Polymer

1) Ethylene-α-olefin Copolymer a) Ethylene-propylene-ethylidenenorbornene (ENB) Copolymer (TPE-1)

It is produced by a method using a metallocene catalyst as described in JP-A-3-163088. A composition ratio of ethylene/propylene/ENB in the copolymer is 72/24/4 (ratio by weight), and Mooney viscosity thereof is 100. It is hereinafter referred to as TPE-1.

b) Ethylene-propylene-ethylidenenorbornene (ENB) Copolymer (TPE-2)

It is produced by a method using a usual Ziegler catalyst. A composition ratio of ethylene/propylene/ENB in the copolymer is 72/24/4 (ratio by weight), and Mooney viscosity thereof is 105. It is hereinafter referred to as TPE-2.

c) Ethylene-octene-1 Copolymer (TPE-3)

It is produced by a method using a metallocene catalyst as described in JP-A-3-163088. A composition ratio of ethylene/octene-1 in the copolymer is 72/28 (ratio by weight), and Mooney viscosity thereof is 100. It is hereinafter referred to as TPE-3.

2) Production of Hydrogenated Conjugated Diene Rubber

Using a 10-liter volume jacketed autoclave equipped with a stirrer as a reactor, a butadiene/n-hexane solution (butadiene concentration 20% by weight) and a n-butyllithium/n-hexane solution (concentration 5% by weight) are introduced therein at a rate of 20 liter/hr and at a rate of 70 ml/hr, respectively, and continuous polymerization of butadiene is carried out at a polymerization temperature of 110° C. The resulting active polymer is de-activated with methanol, and 8 liters of the polymerization liquid is transferred to another 10-liter volume jacketed reactor equipped with a stirrer. That obtained by mixing 250 ml of a di-p-tolylbis(1-cyclopentadienyl)titanium/cyclohexane solution (concentration 1 ml/l) and 50 ml of a butyllithium solution (concentration 5 ml/l) at 0° C. under hydrogen pressure of 2 kg/cm$^2$ is added thereto at 60° C. as a hydrogenation catalyst, and the mixture is allowed to react for 30 minutes under hydrogen partial pressure of 3 kg/cm$^2$. To the resulting hydrogenated polymer solution, 2,6-di-t-butylhydroxytoluene as an antioxidant is added in an amount of 0.5 part per part of the polymer, and then the solvent is removed. At this time, a butadiene polymer is hydrogenated under varied hydrogenation conditions (hydrogenation pressure, hydrogenation temperature, time and catalyst amount), thereby obtaining respective hydrogenated polymers. Each rubber like polymer has Mooney viscosity of 100. The results were as described in Tables 1 and 2. The crystallization peak calorie is decreased with increase of the polar compound used or lowering of the polymerization temperature. A hydrogenated styrene-butadiene copolymer is obtained in a manner similar to that mentioned above, except that styrene is additionally used.

(b) Thermoplastic Resin
1) Homopolypropylene
Isotactic homopolypropylene, manufactured by SUN-ALLOMER Co. (hereinafter referred to as PP)
The melt viscosity measured under conditions of a melting temperature of 200° C. and a shearing speed of 1000 l/sec is 100,000 Pa.
(c) Cross-linking Agent
1) Cross-linking Initiator (C-1)
2,5-Dimethyl-2,5-bis(t-butylperoxy)hexane (a Commercial Name of PERHEXA 25B, Manufactured by NOF Corporation) (Hereinafter Referred to as POX-1)
2) Polyfunctional Monomer (C-2)
Triallyl isocyanurate (manufactured by NIPPON KASEI K.K, hereinafter referred to as TAIC)
(d) Softening Agent: Paraffin Oil
DIANA process oil PW-90 manufactured by Idemitsu Kosan Co., Ltd. (hereinafter referred to as MO)

EXAMPLES 1 TO 3 AND COMPARATIVE EXAMPLES 1 TO 3

Using a twin screw extruder having a feeding mouth at the center of a barrel, each composition comprising (A) TPE described in Table 1/(B) PP/(C-1) POX/(C-2) TAIC/(D) MO in a weight ratio of 50/50/0.3/0.7/30 is melt-kneaded under the following standard conditions in the following manner. As the screw, a double-blade screw having kneading means before and after the feeding mouth is used. Incidentally, the particle diameter of the rubber like polymer is controlled by varying a melt viscosity ratio of (A)/(B) measured under conditions of a melting temperature of 20° C. and a shearing speed of 1000 l/sec, respective amounts of POX and TAIC, a cylinder temperature (melting temperature) relying on a one minute decomposition half-life temperature $T_{1/2}$, and a screw rotating number. In order to obtain a small particle, it is necessary to use high shearing power and to control a cross-linking speed. More specifically, POX and TAIC are decreased in their amounts to be used, and the reaction is carried out for a long period of time at a temperature as low as possible but not lower than the decomposition temperature of POX. The above-mentioned melt viscosity ratio of (A)/(B) is controlled in a manner such that a rubber like polymer having the same Mooney viscosity is used not as to vary the melt viscosity of (A), and a molecular weight of PP (B) is varied so as to vary the melt viscosity of PP (B).

(Standard Melting Conditions)
1) Melt extrusion temperature: 220° C. constant
2) Output: 12 kg/hr
3) Extruder: inner diameter of barrel =25 mm
4) L/D=47, wherein L is length of the extruder (mm)
5) Screw rotating number N=280 rpm The thus obtained composition is molded at 200° C. using an injection-molding machine, thereby obtaining a sheet having a thickness of 2 mm, and its characteristics are evaluated.

The results are as shown in Table 1.

As clear in Table 1, elongation at break, appearance and moldability are superior when the particle diameter meets requirements of the present invention.

EXAMPLE 4 TO 10

Example 1 is repeated, except that (A) is changed to hydrogenated rubber. The results are as shown in Table 2.

EXAMPLES 11 TO 13

Figure 1:
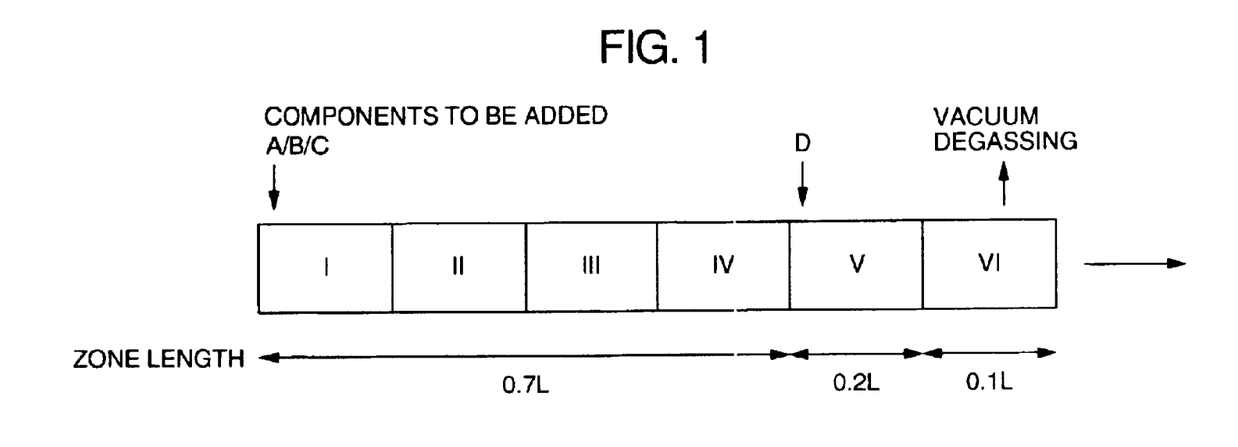
FIG. 1 is a drawing showing an extrusion process using a typical twin screw extruder, in which process the component A to be added is impregnated with C, at the same time B is dry-blended therewith, and thereafter the cross-linking reaction is carried out, as shown in Example 12.

Example 1 is repeated, except that a twin extruder having 6 zones as shown in FIG. 1 is used, the melt viscosity ratio of (A)/(B) measured under conditions of a melting temperature of 200° C. and a shearing speed of 1000 l/sec is changed to 1.4 in the composition of Example 1, and the manner is changed to that described in Table 3. The results are as shown in Table 3.

TABLE 1

| | | Unit | Example 1 | Example 2 | Comp. Example 1 | Comp. Example 2 | Example 3 | Comp. Example 3 |
|---|---|---|---|---|---|---|---|---|
| Production condition | Kind of (A) | | TPE-1 | TPE-1 | TPE-1 | TPE-1 | TPE-3 | TPE-2 |
| | (A)/(B) viscosity ratio | | 0.9 | 5 | 0.9 | 13 | 0.9 | 0.9 |
| | T2-T1 (difference between reaction temperature and $P_{ox}$ decomposition temperature) | ° C. | 10 | 10 | 50 | 10 | 10 | 10 |
| Characteristics | Weight average particle diameter | μm | 0.9 | 2.0 | 3.6 | 4.2 | 1.5 | 1.3 |
| | Tensile strength | MPa | 10.5 | 9.2 | 6.3 | 5.8 | 9.8 | 6.5 |
| | Appearance Visual judge | | ⊚ | ○ | x | x | ○ | Δ |
| | Gloss | % | 38 | 32 | 23 | 18 | 36 | 29 |
| | Moldability Vacuum Moldability | | ⊚ | ○ | x | x | ○ | ○ |
| | Melt elongation | m/min. | 48 | 40 | 22 | 18 | 40 | 38 |

TABLE 2

| | | Unit | Example 4 | Example 5 | Example 6 | Example 7 | Example 8 | Example 9 | Example 10 |
|---|---|---|---|---|---|---|---|---|---|
| Component (A) | Kind | | Hydrogenated rubber | | | | | | |
| | Hydrogenation percent | % | 50 | 85 | 90 | 95 | 100 | 95 | 95 |
| | Remaining double bond in main chain* | % | 44 | 11 | 8 | 4.5 | 0 | 4.5 | 4.5 |

TABLE 2-continued

|  |  | Unit | Example 4 | Example 5 | Example 6 | Example 7 | Example 8 | Example 9 | Example 10 |
|---|---|---|---|---|---|---|---|---|---|
|  | Remaining double bond in side chain** | % | 6 | 4 | 2 | 0.5 | 0 | 0.5 | 0.5 |
|  | B/S Weight ratio*** |  | 100/0 | 100/0 | 100/0 | 100/0 | 100/0 | 80/20 | 70/30 |
| Characteristics | Weight average particle diameter | μm | 2.3 | 1.9 | 1.3 | 0.8 | 0.7 | 0.8 | 0.9 |
|  | Tensile strength | MPa | 8.1 | 9.0 | 9.5 | 10.3 | 10.0 | 11.2 | 12.3 |
|  | Appearance Visual judge |  | Δ | o | o | ⊚ | ⊚ | ⊚ | ⊚ |
|  | Gloss | % | 29 | 31 | 38 | 40 | 39 | 42 | 49 |
|  | Moldability Vacuum moldability |  | Δ | o | o | ⊚ | ⊚ | ⊚ | ⊚ |
|  | Melt elongation | m/min. | 30 | 39 | 41 | 49 | 48 | 51 | 53 |

Note:
*quantity of 1,4-bond
**quantity of 1,2-vinyl bond
***B (butadiene)/S (styrene)

TABLE 3

Figure 2:
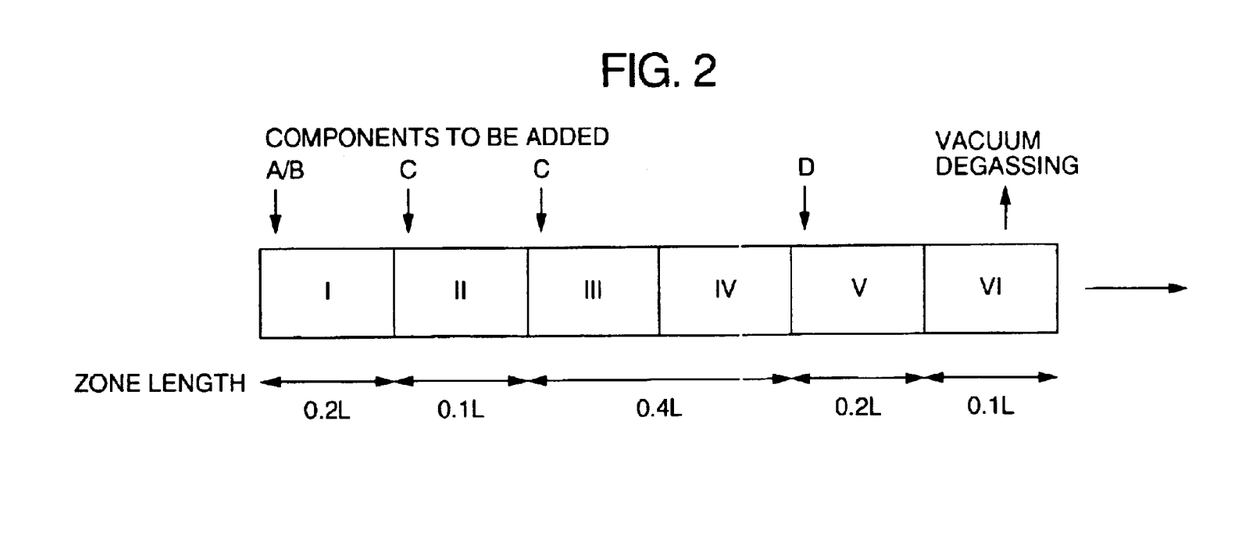
FIG. 2 is a drawing showing an extrusion process using a typical twin screw extruder, in which process after melting A/B, C is separately added thereto to effect the cross-linking reaction, as shown in Examples 11 and 13.

|  |  | Unit | Example 11 | Example 12 | Example 13 |
|---|---|---|---|---|---|
| Production condition | Kind of (A) |  | TPE-1 | TPE-1 | TPE-1 |
|  | Addition time of (C) |  |  |  |  |
|  | Before or after melting (A) |  | After | Before | After |
|  | Before or after melting (B) |  | After | Before | After |
|  | Number of separation of (C) |  | 2 | 1 | 1 |
|  | Separation ratio of (C) (first time/second time) |  | 20/80 | 100/0 | 100/0 |
|  | Process |  | FIG. 2 | FIG. 1 | FIG. 2 |
| Characteristics | Weight average particle diameter | μm | 0.7 | 1.4 | 1.0 |
|  | Tensile strength | MPa | 12.5 | 9.4 | 10.0 |
|  | Appearance Visual judge |  | ⊚ | ⊚ | ⊚ |
|  | Gloss | % | 43 | 33 | 37 |
|  | Moldability Vacuum moldability |  | ⊚ | ⊚ | ⊚ |
|  | Melt elongation | m/min. | 53 | 43 | 48 |

What is claimed is:

1. An olefin polymer composition, which comprises a cross-linked olefin polymer composition comprising at least one cross-linking rubber like polymer (A) and an olefin resin (B), said cross-linking rubber like polymer (A) being selected from the group consisting of (1) an ethylene-α-olefin copolymer, which contains an ethylene unit and an α-olefin unit having 3 to 20 carbon atoms, and which is produced using a metallocene catalyst, and (2) at least one hydrogenated rubber selected from the group consisting of a homopolymer of a conjugated diene monomer and a copolymer thereof, in which rubber not less than 50% of all olefinic double bonds are hydrogenated, wherein the cross-linking rubber like polymer (A) has a weight average particle diameter of from 0.01 to 3 μm.

2. The olefin polymer composition according to claim 1, wherein the olefin resin (B) is a propylene resin.

3. The olefin polymer composition according to claim 2, wherein the olefin resin (B) comprises a random copolymer propylene resin of propylene and at least one selected from the group consisting of an α-olefin having 2 carbon atoms and those having 4 to 20 carbon atoms.

4. The olefin polymer composition according to claim 2 or 3, wherein the olefin resin (B) is a propylene resin produced by using a metallocene catalyst.

5. The olefin polymer composition according to claim 2, which comprises a cross-linked thermoplastic polymer composition comprising the cross-linking rubber like polymer (A) and the olefin resin (B), wherein the olefin resin (B) in the composition has a crystallization temperature ranging from 110 to 150° C. measured according to differential scanning calorimetry (DSC method), and the olefin resin (B) has a crystallization calorie ranging from 30 to 200 J/g measured according thereto.

6. A process for producing the olefin polymer composition according to claim 1, which comprises cross-linking a cross-linking rubber like polymer (A) and an olefin resin (B) with a cross-linking agent (C) containing a cross-linking initiator (C-1) as an essential component and if necessary, at least one selected from the group consisting of a polyfunctional monomer (C-2) and a monofunctional monomer (C-3), at a melt viscosity ratio $\eta_A/\eta_B$ of from 0.5 to 5, where $\eta_A$ and $\eta_B$ are measured under conditions of a melting temperature of 200° C. and a shearing speed of 1000 1/sec, at a temperature ranging from a temperature lower by 30° C. than a one minute decomposition half-life temperature $T_{1/2}$ of the cross-linking initiator (C-1) to a temperature higher by 30° C. than the $T_{1/2}$ to the extent of a cross-linking degree of not less than 30%.

7. The process according to claim 6, wherein the cross-linking agent (C) is separately added a plurality of times.

8. The process according to claim 7, wherein at the time when the cross-linking agent (C) is separately added to carry out cross-linking one after another, the cross-linking agent (C) is added at a first time to effect the cross-linking to the extent of a cross-linking degree of from 5 to 45%, and the cross-linking agent (C) is successively added to effect the dross-linking to the extent of a cross-linking degree of not less than 50%.

9. The process according to any one of claims 6 to 8, wherein the cross-linking is effected in a manner that the cross-linking rubber like polymer (A) and the olefin resin (B) are melt-blended with each other, and thereafter the cross-linking agent (C) is added thereto under melting conditions.

10. The process according to claim 9, wherein the cross-linking is carried out using a twin screw extruder, which has a ratio (L/D) between an inner diameter of a cylinder D and a length of a screw L of from 20 to 100, which has a main feeding port and at least one side feeding port, which are placed at different positions from each other in distance from the top portion of the extruder, and which has at least three zones, Zones I to III, in the order named from the main feeding port, each zone length being from 0.05 to 0.5L, wherein the cross-linking rubber like polymer (A) and the olefin resin (B), and if desired, at least one of the polyfunctional monomer (C-2) and the monofunctional monomer (C-3), which are fed through the main feeding port are melt-blended with one another in Zone I, successively a part of the cross-linking agent (C) fed through the side feeding port is melt-blended therewith in Zone II, and further a remaining part of the cross-linking agent (C) fed through the side feeding port is melt-blended therewith in Zone III.

11. The process according to claim 10, wherein after completion of the addition of the cross-linking agent (C), a softening agent (D) is added and melt-blended therewith.

12. The process according to claim 11, wherein the twin screw extruder further has at least one zone having a length of from 0 to 0.4L in the back of Zones I to III, wherein the cross-linking rubber like polymer (A) and the olefin resin (B), and if desired other components are melt-blended in Zone IV, the softening agent (D) is melt-blended in said Zone or the other successive zone, and a volatile matter is removed.

* * * * *